United States Patent Office 3,317,535
Patented May 2, 1967

3,317,535
POTASSIUM HYDROGEN SULFITE ADDITION PRODUCT 6-L-(1-CYTOSINYL) AND (1-URACILYL)-5-HYDROXY-p-DIOXANE-2-D-CARBOXYALDEHYDE
Harvey E. Alburn, West Chester, and William Dvonch, Radnor, Pa., assignors to American Home Products Corporation, New York, N.Y., a corporation of Delaware
No Drawing. Filed Feb. 19, 1965, Ser. No. 434,091
2 Claims. (Cl. 260—256.4)

This invention is directed to compounds having antiinflammatory activity, as determined by standard experimental procedures with warm blooded animals, and to therapeutic compositions containing such compounds.

The compounds found to exhibit the above indicated activity are the following: α-L-(9-adeninyl)-α'-D-hydroxymethyldiglycolic aldehyde (I); monopotassium bisulfite addition compound of the periodate oxidation product of cytidine, also called: 6-L-(1-cytosinyl)-5-hydroxy-p-dioxane-2-D-carboxyaldehyde, potassium hydrogen sulfite addition product (II); monopotassium bisulfite addition compound of the periodate-oxidation product of uridine, also called: 6-L-(1-uracilyl)-5-hydroxy-p-dioxane-2-D-carboxaldehyde, potassium hydrogen sulfite addition product (III); α-D-methoxy-α'-D-(hydroxymethyl)diglycolic aldehyde; α-D-methoxy-α'-D-(hydroxymethyl)diglycolic aldehyde, bis sodium bisulfite addition compound; α-L-(1-uracilyl)-α'-D-(hydroxymethyl)diglycolic aldehyde; α-L-(9-xanthinyl)-α'-D-(hydroxymethyl)diglycolic aldehyde; α-L-(9-hypoxanthinyl)-α'-D-(hydroxymethyl)diglycolic aldehyde; and α-L-9-adeninyl)-α'-D-(hydroxymethyl)diglycolic aldehyde, phosphate ester.

To prepare compound (I), adenosine (5.00 g.; 18.7 mmole) is oxidized with 0.1 M periodic acid solution (206 ml.; 20.6 mmole) for half an hour at 25° C. in the dark. The solution is passed over a Dowex-1-acetate column (32 ml. volume), and the column is washed with one liter of water. The iodate-periodate-free solution and wash are freeze-dried to yield the periodate-oxidation product. The other diglycolic aldehydes in the above list are prepared in the same manner.

Compounds (II) and (III) are prepared first by reacting cytidine and uridine, respectively, with periodic acid, as above described for compound (I) and then dissolving about 0.01 mole of the periodate oxidation products thus produced in 100 ml. of water with about 0.005 mole of potassium metabisulfite. The resulting solution is then freeze-dried and the compounds are obtained in substantially quantitative yields. The bis sodium bisulfite compound in the above list is prepared as indicated in the foregoing but using 0.02 mole of sodium bisulfite.

Preparation of α-L-(9-adeninyl)-α'-D-(hydroxymethyl) diglycolic aldehyde, phosphate ester.

5'-adenylic acid (14.2 g.; 40.9 mmoles) was oxidized with 0.1 M periodic acid (450 ml.; 45.0 mmoles) for 1 hr. at 25° in the dark. Oxidation was complete at a 94–95% level at this time. The solution was passed over a column of Dowex-1-acetate (69 ml.; 90 meq.), and the column was washed with three column volumes of water. The self-eluate and wash were freeze-dried to give 8.4 g. product. Analysis of the product confirmed the empirical formula as being $C_{10}H_{12}N_5O_7P$.

The compounds of the invention are administered to an organism having an inflammatory condition such as chronic arthritis, chronic or acute gout, scleroderma, etc. at a daily dosage range ranging from 5 to 120 mg./kg. of body weight, depending upon the precise inflammatory condition to be treated and its severity. A therapeutically administrable composition in accordance with this invention contains from 1.5 to 80 mg. of these compounds dissolved in 1 cc. of water, 0.5% carboxy methyl cellulose solution or corn oil. The compounds of the invention may be administered by intravenous, intramuscular, intraperitoneal or subcutaneous methods as desired depending on the particular species being treated and the adaptability of the species to the mode selected.

The present compounds were evaluated for their antiinflammatory activity by the following tests. In one of these tests, male Charles River rats weighing approximately 200 g. are used. Arthritis is induced by an intradermal injection (0.05 ml.) of a suspension of heat killed tubercle bacilli in mineral oil (concentration 5 mg. per ml.) into the plantar surface of the left hind paw. These compounds are administered on the day that the tubercle bacilli are injected and daily thereafter for 14 days. Change in body weight, severity of lesions on the ears and tail, and percentage prohibition of increase in thickness of the injected foot are used to evaluate the activity of compounds. Comparison is made with hydrocortisone as the standard (Newbould, B. B., Brit. Jour. Pharm. Chemoth., 21: 127–136 (1963). When evaluated by the above-outlined procedure, compound (I) exhibited three times the activity of hydrocortisone.

The present compounds were also tested for antiinflammatory activity by the method of C. A. Winter, et al., Federation Proceedings, March-April 1963, 22, No. 2, Part I. In this test, bilaterally adrenalectomized Wistar male rats are anesthetized and 2 cotton pellets are inserted subcutaneously. Room temperature is maintained at 78–80° F. and animals are provided with 1% saline containing 0.01% glucose, and a standard stock diet. Beginning on the same day the treatment is administered twice intramuscularly, orally or subcutaneously daily for 5 consecutive days (10 doses) and the autopsies are performed on the 7th day. The granulomas (cotton pellets) are dried for 72 hours at 80° C. and then maintained for 24 hours at room temperature. Pellets are weighed individually.

(1) Initial and (2) final body weights are determined to the nearest gram; as are (3) weights of pooled thymus (wet); (4) Net weight dry granulomas to nearest 0.1 mg.

(A) Percent inhibition=Average increase (mean) in pellet weights of $$\frac{\text{treated group}}{\text{Average increase (mean) in pellet weights of}} \times 100$$

(B) Statistical significance and percent relative potency of test compound are compared with phenylbutazone.

The compounds of this invention can be made available in administrable unit dosage forms by associating them with well-known inert carriers.

Having fully disclosed their invention in the foregoing paragraphs, the subject matter which the applicants regard as novel is specifically pointed out and particularly claimed as follows.

What is claimed is:
1. 6-L-(1-cytosinyl)-5-hydroxy-p-dioxane-2-D-carboxaledehyde, potassium hydrogen sulfite addition product.
2. 6-L-(1-uracilyl)-5-hydroxy-p-dioxane-2-D-carboxaldehyde, potassium hydrogen sulfite addition product.

No references cited.

ALEX MAZEL, *Primary Examiner.*
MARY U. O'BRIEN, *Assistant Examiner.*